United States Patent
Nakajima

[19]

[11] Patent Number: 6,128,038

[45] Date of Patent: Oct. 3, 2000

[54] IMAGE INFORMATION RECORDING MEDIUM AND IMAGE PROCESSING SYSTEM GENERATING THE RECORDING MEDIUM

[75] Inventor: Nobuyoshi Nakajima, Kanagawa-ken, Japan

[73] Assignee: Fuji Photo Film Co., Ltd., Kanagawa-ken, Japan

[21] Appl. No.: 09/126,740

[22] Filed: Jul. 31, 1998

[30] Foreign Application Priority Data

Aug. 1, 1997 [JP] Japan .................................. 9-207881
Jul. 29, 1998 [JP] Japan .................................. 10-213985

[51] Int. Cl.[7] .............................. H04N 5/76; H04N 5/262
[52] U.S. Cl. ........................................... 348/232; 348/239
[58] Field of Search ................... 355/40, 41, 27, 355/28, 29; 348/232, 239; 395/102, 117; 707/526, 527, 513

[56] References Cited

U.S. PATENT DOCUMENTS

| | | | |
|---|---|---|---|
| 5,138,459 | 8/1992 | Roberts et al. | 348/232 |
| 5,574,533 | 11/1996 | Itoh | 396/639 |
| 5,633,678 | 5/1997 | Parulski et al. | 348/232 |
| 5,745,218 | 4/1998 | Sugahara et al. | 355/40 |
| 5,799,219 | 8/1998 | Moghadam et al. | 396/319 |
| 5,841,885 | 11/1998 | Neff et al. | 382/112 |
| 5,899,995 | 5/1999 | Millier et al. | 707/102 |
| 5,926,288 | 6/1999 | Dellert et al. | 358/487 |
| 5,943,093 | 8/1999 | Anderson et al. | 348/232 |

OTHER PUBLICATIONS

Eastman Kodak Company, Press Release: "Kodak, HP, Live Picture and Microsoft Unveil New Way to Use and Share Images on Computers." http://www.kodak.com, Jun. 3, 1996.

Eastman Kodak Company, Press Release: "Photo CD Imaging Workstations Will Produce FlashPix–Format CDs, Scan Advanced Photo System Film." http://www.kodak.com, Sep. 12, 1996.

Eastman Kodak Company, Press Release: "Kodak Image Magic Workstations Expand To Make Picture Creativity Powerful And Easy For Consumers." http://www.kodak.com, Sep. 12, 1996.

*Primary Examiner*—Russell Adams
*Assistant Examiner*—Rodney Fuller

[57] ABSTRACT

Accompanying information obtained at the time of photographing, such as IX information on an APS film or Exif tag information in a digital camera, can be used efficiently and easily when image data having been recorded in a file are reproduced. The accompanying information such as the IX information or the Exif tag information is obtained from an image source together with image data. A file in which the accompanying information is described as property streams of a structured storage file comprising the image data and the accompanying information as its components is automatically generated and recorded in a recording medium such as a CD-R to be provided to a customer.

20 Claims, 2 Drawing Sheets

IMAGE INFORMATION RECORDING MEDIUM AND IMAGE PROCESSING SYSTEM GENERATING THE RECORDING MEDIUM

BACKGROUND OF THE INVENTION

1. Field of the Invention

The present invention relates to a computer-readable image information recording medium which records image data obtained from a film or a digital camera together with property information thereof, such as the title and the date of recording, and to a image processing system which generates the recording medium.

2. Description of the Related Art

A photograph finishing system which prints accompanying information such as the date of photographing obtained at the time of photographing by an APS camera on the back of a photographic print has been known. In the Exif format, which is a file format of an image obtained by a digital camera, it is also a rule to add accompanying information such as the date of photographing as tag information of image data. This information is used by personal computer software when the image data are input from a digital camera to the personal computer.

Meanwhile, a digital output service which records digital images read from a film in a Photo CD, an MO disc, or the like, and provides the storage medium to a customer has been carried out. As an image file format appropriate for the digital output service, a structured storage file called a FlashPix file has been proposed by Eastman Kodak Co.

As a system to carry out such a digital output service, a photograph finishing system which carries out photographic print generation and outputting to a recording medium at simultaneously with film reading has been proposed in U.S. Ser. No. 08/974,888. This photograph finishing system comprises a film scanner, image processing means, a printer, and a medium drive. This system reads a developed film by the film scanner feeding the film automatically, carries out image processing appropriate for print output or for output to a recording medium on image data having been obtained, and outputs the processed image data by the printer and the medium drive simultaneously or alternately.

Another system, such as a system which further comprises a function to input an image from a digital camera or a recording medium has also been proposed (see U.S. Ser. No. 08/974,888).

FIG. 2 shows an outline of such a system. Image data obtained from a digital camera 9 or a film 10 are processed by an image handling apparatus 7. The processed image data are reproduced as a photographic print 11 by a photographic printer 8 and also recorded as an image file in a recording medium such as a CD-R 12.

The above FlashPix file records various kinds of property information on image data together with the image data in one file. The property information includes the date of file generation, the kind of an image source (an image read from a film or input from a digital camera), and the size of a first print, for example.

When a photographic image is stored as a file and will be reproduced later, it is preferable that accompanying information obtained at the time of photographing, such as the above information for image generation in a laboratory, the date of photographing, the aspect ratio, and usage of flash at the time of photographing, is also stored to be used effectively later in the reproduction of the image. Furthermore, upon generating a file, it is preferable for a system to comprise a function which can automatically input the information such as the above to a file, without having an operator input the information.

SUMMARY OF THE INVENTION

Based on consideration of the above problems, the present invention presents a file format to record both image data and accompanying information obtained at the time of An image processing system of the invention, such as a photograph finishing system, can automatically generate such a format file and record the file in a recording medium such as a CD-R or the like.

An image information recording medium of the present invention is a computer-readable image information recording medium wherein a structured storage file comprising the image information is recorded, and is characterized in that the structured storage file comprises, as its components, image data obtained by reading a photographic image recorded on a film or by inputting image data having been recorded in a memory of a digital camera; and accompanying information magnetically recorded on the film or added to the image data by the digital camera.

The structured storage file has a hierarchy structure similar to a directory structure in a conventional file system, and records plural kinds of data in different nature as components composing the hierarchy. This file structure has an advantage that the data in the same file can be dealt with by different application software. Furthermore, upon changing the size of a portion of the data, it is not necessary to change a program referring to the rest of the data in the file because of the hierarchy structure. This accessibility aspect of the hierarchical storage file is different from a conventional file without the hierarchy structure.

In the present invention, the image data and the accompanying information are recorded as streams which are components of a structured storage file. Each stream is recorded in a storage structure which is equivalent to a conventional directory. The structured storage is widely known as a technique used in Component Object Model (COM) proposed by Microsoft Corp., and its explanation in detail is omitted here.

"The accompanying information magnetically recorded on the film" means IX information on an APS film, for example. "The accompanying information added to the image data by the digital camera" means tag information in an Exif file, for example.

A image processing system of the present invention outputs a structured storage file in the above format to a recording medium.

There are two kinds of image processing systems which will be explained below. Alternatively, the image processing system may comprise both kinds of functions below.

A first image processing system of the present invention comprises film image reading means which obtains image data by reading a film, and medium output means which generates a structured storage file comprising the image data as a component thereof and outputs the file in a recording medium, further comprises:

accompanying information reading means which reads accompanying information having been recorded on the film; and accompanying information converting means which converts the accompanying information having been read into a format predefined as a format of a component of the structured storage file; and is characterized by that the medium output means generates a structured storage file whose components are the image data and the accompanying information having been converted by the accompanying information converting means and records the structured storage file in the recording medium.

A second image processing system of the present invention comprises data obtaining means which obtains image data recorded in a memory of a digital camera, and medium output means which generates a structured storage file comprising the image data as a component thereof and outputs the file in a recording medium, further comprises:

accompanying information obtaining means which obtains accompanying information having been added to the image data by the digital camera; and accompanying information converting means which converts the accompanying information having been obtained into a format predefined as a format of a component of the structured storage file; and is characterized by that the medium output means generates a structured storage file whose components are the image data and the accompanying information having been converted by the accompanying information converting means and records the structured storage file in the recording medium.

Another image processing system of the present invention outputs a structured storage file in the above format to a recording medium while carrying out print generating processing to generate a first print or the like. There are two kinds of image processing systems which will be explained below. Alternatively, the image processing system may comprise both kinds of functions below.

A third image processing system of the present invention comprises film image reading means which obtains image data by reading a film, print outputting means which outputs the image data having been obtained by the film image reading means as a photographic print, and medium output means which generates a structured storage file comprising the image data as a component thereof and outputs the file in a recording medium, further comprises:

accompanying information reading means which reads accompanying information having been recorded on the film; and accompanying information converting means which converts the accompanying information having been read into a format predefined as a format of a component of the structured storage file; and is characterized by that the medium output means generates a structured storage file whose components are the image data and the accompanying information having been converted by the accompanying information converting means and records the structured storage file in the recording medium.

A fourth image processing system of the present invention comprises data obtaining means which obtains image data recorded in a memory of a digital camera, print outputting means which outputs the image data having been obtained by the data obtaining means as a photographic print, and medium output means which generates a structured storage file comprising the image data as a component thereof and outputs the file in a recording medium, further comprises:

accompanying information obtaining means which obtains accompanying information having been added to the image data by the digital camera; and accompanying information converting means which converts the accompanying information having been obtained into a format predefined as a format of a component of the structured storage file; and is characterized by that the medium output means generates a structured storage file whose components are the image data and the accompanying information having been converted by the accompanying information converting means and records the structured storage file in the recording medium.

The structured storage file recorded in the recording medium of the present invention includes a stream having IX information having been read from a film or tag information in an Exif file in a digital camera, and reproduction of an image can be carried out while based on the IX or tag information. More specifically, upon displaying an image on a monitor, the image can be displayed based on aspect ratio information of the image, such as C, H, and P.

Furthermore, according to the image processing system of the present invention, the IX information and the tag information in an Exif file is input automatically from a film or a digital camera to the system upon generating a first print. After the information has been converted automatically into the predefined format, the information is described as a stream in a structured storage file. Therefore, an operator does not need to input or reconstruct the accompanying information.

DESCRIPTION OF THE PREFERRED EMBODIMENT

Figure 1:
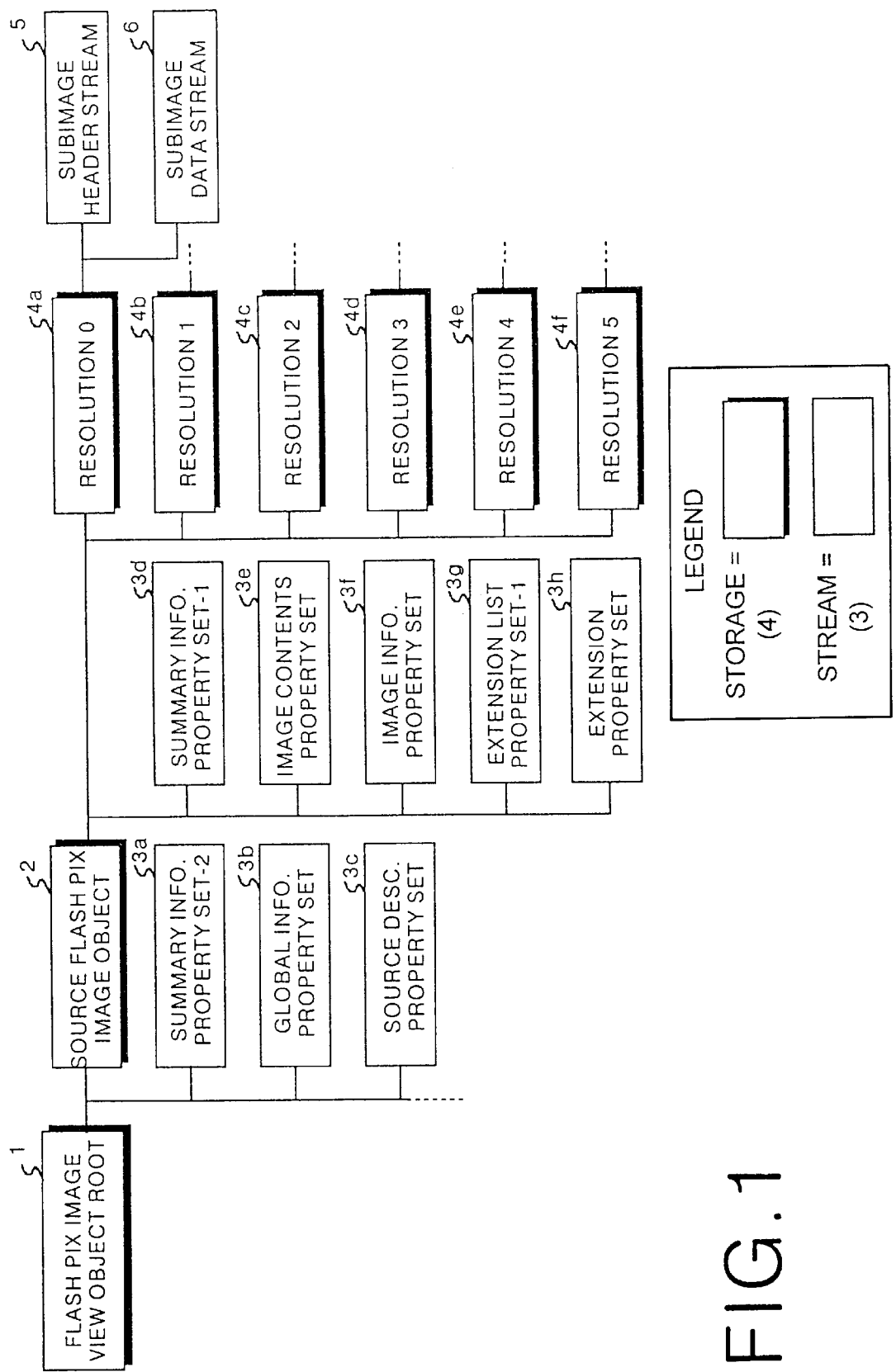
FIG. 1 is a diagram showing an example of a structured storage file to be recorded in an image information recording medium of the present invention.

Hereinafter, an embodiment of the present invention will be explained with reference to the accompanying drawings. FIG. 1 shows an example of a structured storage file to be recorded in an image information recording medium of the present invention. This structured storage file comprises an image data storage 2 (Source FlashPix image object) which stores image data and a property stream 3 which describes various properties of an image, both of which are under a root storage 1 (FlashPix Image view object root). The image data storage 2 includes storages 4a to 4f which respectively have different resolutions from resolution0 to resolution5, and each storage 4 having the respective resolution comprises a header stream 5 (Subimage Header Stream) and a data stream 6 (Subimage Data Stream). Furthermore, various properties related to the image data are stored as property streams 3d to 3h in the image data storage 2.

The above storages and streams are in accordance with the FlashPix standard, and their explanation in detail is not provided here. However, an image file used in the present invention is not necessarily limited to the FlashPix standard file, and a structured storage file according to another standard may also be used.

In this embodiment, IX information recorded magnetically on an APS film or Exif tag information in a digital camera is completely described in a property stream 3g (Extension list property set-1) and a property stream 3h (Extension property set). A portion of the IX information or the Exif tag information is also described in another property stream based on the FlashPix standard. Therefore, by referring to the property streams 3g and 3h, a conventional system or conventional software which uses the IX information or the Exif tag information can carry out conventional processing on an image recorded as a file of the present invention after comparatively minor change thereon.

Figure 2:
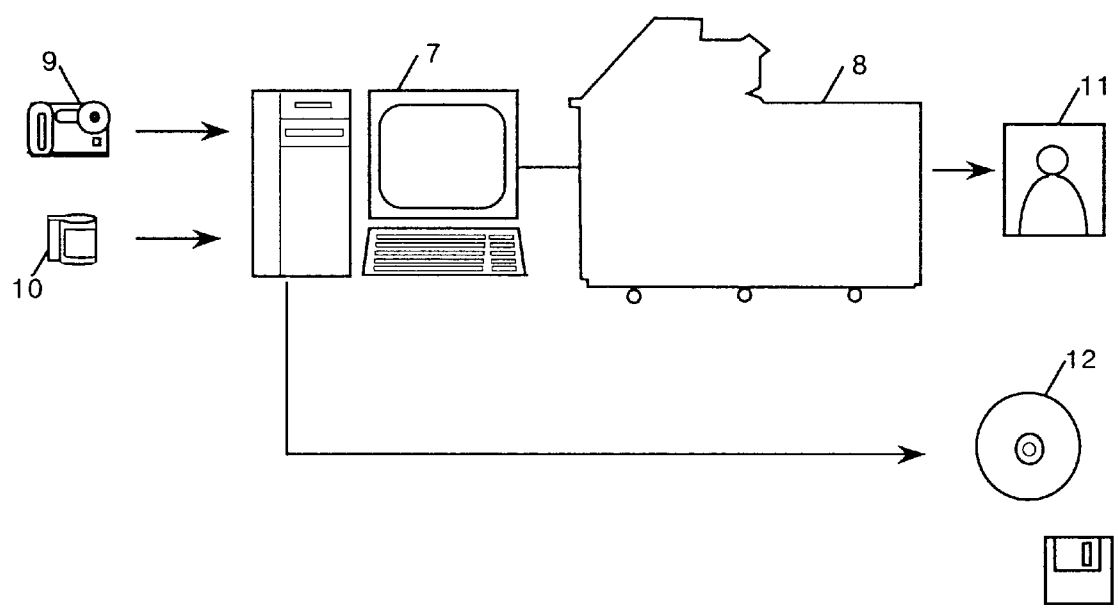
FIG. 2 is a diagram showing an embodiment of a photograph finishing system.

IX information to be described in the property streams 3g and 3h includes information to manage image data, such as the date of photographing and the title, photographing conditions such as flash emission, flash reflection, the amount of light, the kind of light, and lighting conditions, camera setting upon photographing such as a shutter speed and a light measuring mode, camera information such as the number of the camera body, the f value of the camera, and the maximum f value of the lens, and user-specified information such as the printing specification or printing format of the time and date, for example. In the case of Exif tag information, compression mode information upon recording data in a memory of a digital camera and the like is also added to the above IX information. The above information is described in the property streams 3g and 3h as values in a predefined type and in a predefined order. Generation of such a structured storage file is carried out by an image handling apparatus 7 in a system shown in FIG. 2. Alternatively, generation of such a structured storage file may be carried out by a system without a photographic printer 8.

By automatically incorporating various kinds of information obtained by a camera with an image file, a work load of an operator to deal with a file for generation or reproduction thereof will be reduced. Furthermore, for a user to use such a file with a personal computer or the like, display or reproduction processing is enriched, and more enriched digital output service can be realized.

What is claimed is:

1. A structured storage file for storage on a computer-readable recording medium, the file comprising:

image data obtained by reading a recorded photographic image from a photographic film or an electronic memory; and accompanying information recorded with the image data on the photographic film or the electronic memory, the accompanying information being separately stored from the image data in the structured storage file and the accompanying information arranged in a hierarchical data structure wherein the accompanying information includes property information, defining general properties of the image data, and photographic background information describing factors underlying the image data at time of photographically or photoelectronically recording the image data, the property information and the background information for the same image data being stored in different hierarchical levels within the structured storage file.

2. The structured storage file according to claim 1 wherein the hierarchical data structure includes a root storage and wherein distinct branches extend from the root storage, the distinct branches including an image data storage and a plurality of image property streams of the property information.

3. The structural storage file according to claim 1 wherein the hierarchical data structure includes an image data storage and wherein distinct branches extend from the root storage, the distinct branches including a first plurality of image property streams and a second plurality of resolution storages.

4. The structural storage file according to claim 1 wherein the hierarchical data structure includes at least one resolution storage and wherein distinct branches extend from the resolution storage, a subimage header stream and a subimage data stream.

5. An image processing system comprising:

a film image reader for obtaining image data by reading a film;

a medium output device for generating a structured storage file including the image data as a hierarchical component thereof, the medium output device adapted to output the file on a recording medium;

an accompanying information reader for reading accompanying information having been recorded on the film; and an accompanying information converter for converting an initial format of accompanying information having been read into a compatible format for storage as a component of the structured storage file;

the medium output device generating a structured storage file whose components are the image data and the accompanying information having been converted by the accompanying information converter and recording the structured storage file on the recording medium, wherein the accompanying information includes property information, defining general properties of the image data, and photographic background information describing factors underlying the image data at time of photographically or photoelectrically recording the image data, the property information and the background information for the same image data being stored in different hierarchical levels within the structured storage file.

6. An image processing system comprising:

a data obtainer for obtaining image data recorded in a memory of a digital camera;

a medium output device for generating a structured storage file including the image data as a component thereof, the medium output device adapted to output the file on a recording medium;

an accompanying information obtainer for obtaining accompanying information having been added to the image data by the digital camera; and an accompanying information converter for converting an initial format of accompanying information having been obtained into a compatible format for storage as a hierarchical component of the structured storage file;

the medium output device generating a structured storage file whose components are the image data and the accompanying information having been converted by the accompanying information converter and recording the structured storage file in the recording medium, wherein the accompanying information includes property information, defining general properties of the image data, and photographic background information describing factors underlying the image data at time of photographically or photoelectrically recording the image data, the property information and the background information for the same image data being stored in different hierarchical levels within the structured storage file.

7. An image processing system comprising:

a film image reader for reading image data from a film;

a print outputting device for outputting the image data having been obtained by the film image reading means as a photographic print, and medium output device for generating a structured storage file including the image data as a component thereof and outputting the file in a recording medium;

an accompanying information reader for reading accompanying information having been recorded on the film; and an accompanying information converter for converting an initial format of accompanying information having been read into a compatible format for storage as a hierarchical component of the structured storage file;

the medium output device generating a structured storage file whose components are the image data and the accompanying information having been converted by the accompanying information converting means and recording the structured storage file in the recording medium, wherein the accompanying information includes property information, defining general properties of the image data, and photographic background information describing factors underlying the image data at time of photographically or photoelectrically recording the image data, the property information and the background information for the same image data being stored in different hierarchical levels within the structured storage file.

8. An image processing system comprising:

a data obtainer for obtaining image data recorded in a memory of a digital camera;

a print output device for outputting the image data having been obtained by the data obtainer as a photographic print; and a medium output device for generating a structured storage file including the image data as a component thereof and outputting the file in a recording medium;

an accompanying information obtainer for obtaining accompanying information having been added to the image data by the digital camera; and an accompanying information converter for converting the accompanying information from an initial format into a compatible format for storage as a hierarchical component of the structured storage file;

the medium output generator for generating a structured storage file whose components are the image data and the accompanying information having been converted by the accompanying information converter and recording the structured storage file in the recording medium, wherein the accompanying information includes property information, defining general properties of the image data, and photographic background information describing factors underlying the image data at time of photographically or photoelectrically recording the image data, the property information and the background information for the same image data being stored in different hierarchical levels within the structured storage file.

9. An image processing system comprising:

a film image reader for reading a film to obtain image data;

an accompanying information reader for reading accompanying information recorded on the film; and a converter for converting an initial format of the accompanying information read by the accompanying information reader into a compatible format for storage as a hierarchical component of a structured storage file; and a medium output generator for generating and recording the structured storage file, including the component and the image data, on a recording medium, wherein the accompanying information includes property information, defining general properties of the image data, and photographic background information describing factors underlying the image data at time of photographically or photoelectrically recording the image data, the property information and the background information for the same image data being stored in different hierarchical levels within the structured storage file.

10. The image processing system according to claim 9 further comprising a printer for printing the image data from the film image as a photographic print.

11. An image processing system comprising:

an image reader for reading memory of a digital camera to obtain image data;

an accompanying information reader for reading accompanying information recorded in the memory and associated with the image data by the digital camera; and a converter for converting an initial form of the accompanying information read by the accompanying information reader into a compatible format for storage as a hierarchical component of a structured storage file; and a medium output generator for generating the structured storage file from the component and the image data and recording the structured storage on a recording medium, wherein the accompanying information includes property information, defining general properties of the image data, and photographic background information describing factors underlying the image data at time of photographically or photoelectrically recording the image data, the property information and the background information for the same image data being stored in different hierarchical levels within the structured storage file.

12. The image processing system according to claim 11 further comprising a printer for printing the image data from the digital camera as a photographic print.

13. The image processing system according to claim 11 wherein the accompanying information reader comprises a magnetic reading device.

14. The image processing system according to claim 11 wherein the accompanying information reader comprises a magnetic reading device, the film comprises an APS film, and the accompanying information comprises IX information.

15. A structured storage file for storage on a storage medium, the structured file comprising:

an image data storage component at a first hierarchical level;

a plurality of resolution storage components having different resolutions with respect to one another, the resolution storage components stored at a second hierarchical level lower than the first hierarchical level;

a plurality of first stream components at the first hierarchical level having accompanying information describing the image data of the image data storage component;

a plurality of second stream components at the second hierarchical level having photographic background information describing factors underlying the image data at a time of taking the image data.

16. The structured storage file according to claim 15 wherein each of the resolutions storage components has a subimage header stream and a subimage data stream.

17. The structured storage file according to claim 15 wherein the photographic background information includes a date a photograph underlying the image data was taken and a type of image source of the image data.

18. The structured storage file according to claim 15 wherein the photographic background information includes APS camera information added by camera to supplement the image data.

19. The structured storage file according to claim 15 wherein the photographic background information includes tag information in an Exif file.

20. The structured storage file according to claim 15 wherein the photographic background information includes IX information on an APS film.

* * * * *